US011959314B2

(12) United States Patent
Graute et al.

(10) Patent No.: US 11,959,314 B2
(45) Date of Patent: Apr. 16, 2024

(54) MOTOR VEHICLE LOCK

(71) Applicant: Brose Schließsysteme Gmbh & Co. Kommanditgesellschaft, Wuppertal, Wuppertal (DE)

(72) Inventors: Ludger Graute, Essen (DE); René Bekendam, Remscheid (DE)

(73) Assignee: Brose Schließsysteme Gmbh & Co. Kommanditgesellschaft, Wuppertal (DE)

( * ) Notice: Subject to any disclaimer, the term of this patent is extended or adjusted under 35 U.S.C. 154(b) by 45 days.

(21) Appl. No.: 16/892,747

(22) Filed: Jun. 4, 2020

(65) Prior Publication Data

US 2020/0386016 A1 Dec. 10, 2020

(30) Foreign Application Priority Data

Jun. 6, 2019 (DE) ..................... 10 2019 115 445.6

(51) Int. Cl.

*E05B 85/02* (2014.01)
*E05B 79/08* (2014.01)

(Continued)

(52) U.S. Cl.

CPC .............. *E05B 81/16* (2013.01); *E05B 79/08* (2013.01); *E05B 81/04* (2013.01); *E05B 81/86* (2013.01);

(Continued)

(58) Field of Classification Search

CPC ... Y10T 292/1082; E05B 81/16; E05B 79/08; E05B 85/02

See application file for complete search history.

(56) References Cited

U.S. PATENT DOCUMENTS 4,735,447 A * 4/1988 Kleefeldt ................ E05B 81/16 292/201
5,437,174 A * 8/1995 Aydin ................ G07C 9/00944 70/423

(Continued)

FOREIGN PATENT DOCUMENTS

DE 19702205 A1 7/1998
DE 202005015588 U1 12/2005

(Continued)

OTHER PUBLICATIONS

Wikipedia for Circuit Board, dated Sep. 12, 2023, Google Machine Translation attached to original, All together 4 Pages.

(Continued)

*Primary Examiner* — Carlos Lugo
(74) *Attorney, Agent, or Firm* — Dickinson Wright PLLC

(57) ABSTRACT

A motor vehicle lock with a locking mechanism and a lock housing structure, a motorized drive arrangement to actuate a mechanical lock component, a control unit for the actuation of the drive arrangement, and an energy storage arrangement for the electric voltage supply of the drive arrangement and/or the control unit being provided in or on the lock housing structure. The lock housing structure has an inner housing part attached to the locking mechanism and the drive arrangement, a housing cover for closing an upper side of the inner housing part, and, between the inner housing part and the housing cover, a control housing part including a control board of the control unit and the energy storage arrangement, and leadframe lines extending at least in sections along the board plane and connected electrically via the leadframe lines of the leadframe to the control board and drive arrangement.

17 Claims, 2 Drawing Sheets

(51) Int. Cl.
*E05B 81/04* (2014.01)
*E05B 81/16* (2014.01)
*E05B 81/86* (2014.01)

(52) U.S. Cl.
CPC ........... *E05B 85/02* (2013.01); *E05Y 2201/11* (2013.01); *E05Y 2201/42* (2013.01); *E05Y 2400/40* (2013.01); *E05Y 2400/654* (2013.01); *E05Y 2600/502* (2013.01); *E05Y 2600/60* (2013.01); *E05Y 2900/531* (2013.01)

(56) References Cited

U.S. PATENT DOCUMENTS

| | | | | |
|---|---|---|---|---|
| 5,762,384 | A * | 6/1998 | Bartel | E05B 81/40 292/201 |
| 5,937,507 | A * | 8/1999 | Asakura | H02K 11/21 310/43 |
| 6,109,674 | A * | 8/2000 | Bartel | E05B 81/06 292/216 |
| 6,232,684 | B1 | 5/2001 | Haag et al. | |
| 6,580,355 | B1 * | 6/2003 | Milo | E05B 63/248 70/277 |
| 6,698,805 | B2 * | 3/2004 | Erices | E05B 85/02 292/201 |
| 7,207,187 | B2 * | 4/2007 | Funahashi | F04C 29/0085 62/505 |
| 9,353,556 | B2 | 5/2016 | Margheritti et al. | |
| 9,957,736 | B2 * | 5/2018 | Taurasi | E05B 81/06 |
| 10,047,548 | B2 * | 8/2018 | Zeabari | E05B 81/54 |
| 10,454,333 | B2 * | 10/2019 | Neunzig | H02K 5/08 |
| 10,815,706 | B2 * | 10/2020 | Mittelbach | E05B 81/16 |
| 10,914,098 | B2 * | 2/2021 | Zhang | E05C 3/24 |
| 2002/0092331 | A1 * | 7/2002 | Huang | E05B 47/0012 70/278.2 |
| 2006/0226660 | A1 * | 10/2006 | Wu | E05B 41/00 292/145 |
| 2018/0102473 | A1 * | 4/2018 | Itou | H03H 7/06 |
| 2020/0332572 | A1 * | 10/2020 | Ney | H03K 17/97 |

FOREIGN PATENT DOCUMENTS

| | | | |
|---|---|---|---|
| DE | 102009002902 | A1 | 11/2010 |
| DE | 202013103042 | U1 | 10/2014 |
| DE | 102015109494 | A1 | 12/2015 |
| DE | 11201400445 | T5 | 6/2016 |
| DE | 112014004455 | T5 | 6/2016 |
| DE | 102017202070 | A1 | 8/2017 |

OTHER PUBLICATIONS

Wikipedia for Printed circuit board, dated Sep. 12, 2023, 24 Pages.

* cited by examiner

MOTOR VEHICLE LOCK

CROSS-REFERENCE TO RELATED APPLICATIONS

This application claims priority to German Patent Application No. DE 10 2019 115 445.6, filed on Jun. 6, 2019, the disclosure of which is hereby incorporated in its entirety by reference herein.

TECHNICAL FIELD

The present disclosure relates to a motor vehicle lock.

BACKGROUND

The motor vehicle lock in question is equipped with a locking mechanism which as a rule has the locking elements of "lock striker plate" and "locking pawl", and with a lock housing structure. The motor vehicle lock has motorized functions, such as opening of the locking mechanism.

SUMMARY

The present disclosure may be based on the problem of configuring and developing the known motor vehicle lock in such a way that the components which are involved in the actuation of the drive arrangement can be preassembled, and that, at the same time, a high structural flexibility with regard to the position of the drive arrangement is ensured with low costs.

In one or more embodiments, a lock housing structure is provided. The lock housing structure may include a leadframe including of leadframe lines for the connection of the drive arrangement can fully take account of both the desire for preassembly capability and the desire for structural flexibility.

In one or more embodiments, the lock housing structure may include an inner housing part which is fitted with the locking mechanism and the drive arrangement, a housing cover for closing an upper side of the inner housing part, and, between the inner housing part and the housing cover, a control housing part which is fitted with a planar control board of the control unit and the energy storage arrangement. This design of the lock housing structure permits the above-addressed preassembly of the control board and the energy storage arrangement, by the control housing part being fitted with the said control components and possibly further control components. In this way, a self-contained functional unit which can already be subjected to a functional test in the preassembled state can be mounted on the control housing part.

As an example, it is proposed in detail that the control housing part is assigned a leadframe which consists of leadframe lines and extends at least in sections along the board plane, and at least part of the drive arrangement being connected electrically via the leadframe lines of the leadframe to the control board. This means that the arrangement of the drive arrangement is not restricted to the extent of the control board, but rather that the drive arrangement can be arranged largely in any desired manner with a suitable design of the leadframe. By virtue of the fact that the leadframe extends at least in sections along the board plane of the control board, the drive arrangement can be arranged in any desired manner along the board plane offset laterally with respect to the control board. In addition, the control board can be designed independently of the position of the drive arrangement. This results in the possibility of reducing the extent of the control board in the board plane. Furthermore, the control board can assume a simple, in particular rectangular or square, shape, since the control board no longer necessarily has to extend towards the drive arrangement.

As an example, the electric connection of the energy storage arrangement to the control board via leadframe lines of the leadframe may make it possible to position the energy storage arrangement in a laterally offset manner relative to the control board. This spatial decoupling of the energy storage arrangement from the control board also leads here to a high structural flexibility firstly with regard to the position of the energy storage arrangement and secondly with regard to the design of the control board.

The drive arrangement and/or the control board and/or the energy storage arrangement are/is may be connected to the leadframe directly, that is to say without connecting elements which are connected in between. As an example, the use of a plug-in connection or of plug-in connections is proposed. A plug-in connection of this type can firstly be produced easily, and secondly is insensitive to mechanical tolerances in the case of a suitable design.

A particularly compact overall design results with the arrangement of the control board and the energy storage arrangement on the upper side of the dividing wall of the control housing part and the arrangement of the drive arrangement on the lower side of the dividing wall of the control housing part. Here, the dividing wall may be used as a carrier for the leadframe, by the leadframe being embedded in the dividing wall, such as using the plastic injection moulding method. It goes without saying that the dividing wall is configured from a plastic material for this purpose.

The above, offset (in relation to the control board) position of the drive arrangement and possibly the energy storage arrangement results, according to claim 6, by way of a special design of the leadframe lines with a connecting piece and two connector tongues which are arranged on the end side of the connecting piece. One of the said leadframe lines therefore has two connector tongues which lie opposite one another on the end side.

The connector tongues are may be a constituent part of the above-addressed plug-in connection, with the result that the connecting piece provides a counterbearing in the case of the establishing of the plug-in connection. In this context, it is particularly advantageous if the connecting piece is embedded in the dividing wall as addressed above.

One or more embodiments relate to the lock housing structure. It plays an important role here that the control housing part interacts together with the housing cover, in order to configure at least one substantially closed chamber for receiving the energy storage arrangement and/or the control board.

In one or more embodiments, assembly movements which are accompanied by the establishing of the respective plug-in connection. The assembly movement may be additionally accompanied by a clamping fastening of the energy storage arrangement to the control housing part.

The electric connection of the energy storage arrangement to the leadframe may not be impaired during normal operation of the motor vehicle lock, in particular as a result of slamming of an associated motor vehicle door.

A compact variant for the connection of the motor vehicle lock to a higher-level motor vehicle controller, by the control housing part, such as the control board, being fitted with an electric plug arrangement. For this purpose, the housing cover may be equipped with at least one corresponding recess, through which the plug arrangement is accessible.

According to one or more embodiments, a method of producing a motor vehicle lock is provided.

The method may include fitting the control housing part to the control board and the energy storage arrangement, and the inner housing part may be fitted with the control housing part only afterwards. After the fitting of the control housing part with the control board and the energy storage arrangement, a functional test of the functional unit which is preassembled in this way is performed.

In one or more embodiments, the fitting of the control housing part with the control board and/or the energy storage arrangement may take place by way of joining of the control board and/or the energy storage arrangement to the leadframe. This can be realised easily by way of an above plug-in connection, with the result that the method according to the proposal can be implemented with particularly low complexity.

BRIEF DESCRIPTION OF THE DRAWINGS

In the following text, the invention will be described in greater detail on the basis of a drawing which illustrates merely one exemplary embodiment and in which.

DETAILED DESCRIPTION

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

A known motor vehicle lock (DE 20 2013 103 042 U1), from which the invention proceeds, discloses a drive arrangement with an electric drive motor which serves to unlatch the locking pawl of the locking mechanism. In order to ensure the said opening function even in the case of a failure of the electric on-board network of the motor vehicle, the lock housing structure accommodates a capacitive energy storage arrangement. For the case of an emergency, an electric voltage supply for the drive arrangement and/or a control unit which is assigned to the drive arrangement is thus available.

In view of the fact that, depending on the design, the actuation of the drive arrangement is a safety-relevant function, it is desirable for the relevant control components to be provided in a manner which can be preassembled and therefore pretested. This is as a rule accompanied, however, by a restriction of the structural flexibility, in particular with regard to the position of the drive arrangement.

The motor vehicle lock 1 according to the proposal is used in the case of all types of closure elements of a motor vehicle. These include, in particular, side doors, rear doors, tailgates, boot lids, front bonnets, in particular engine bonnets. The said closure elements can be configured in the manner of hinged doors or in the manner of sliding doors.

Figure 1:
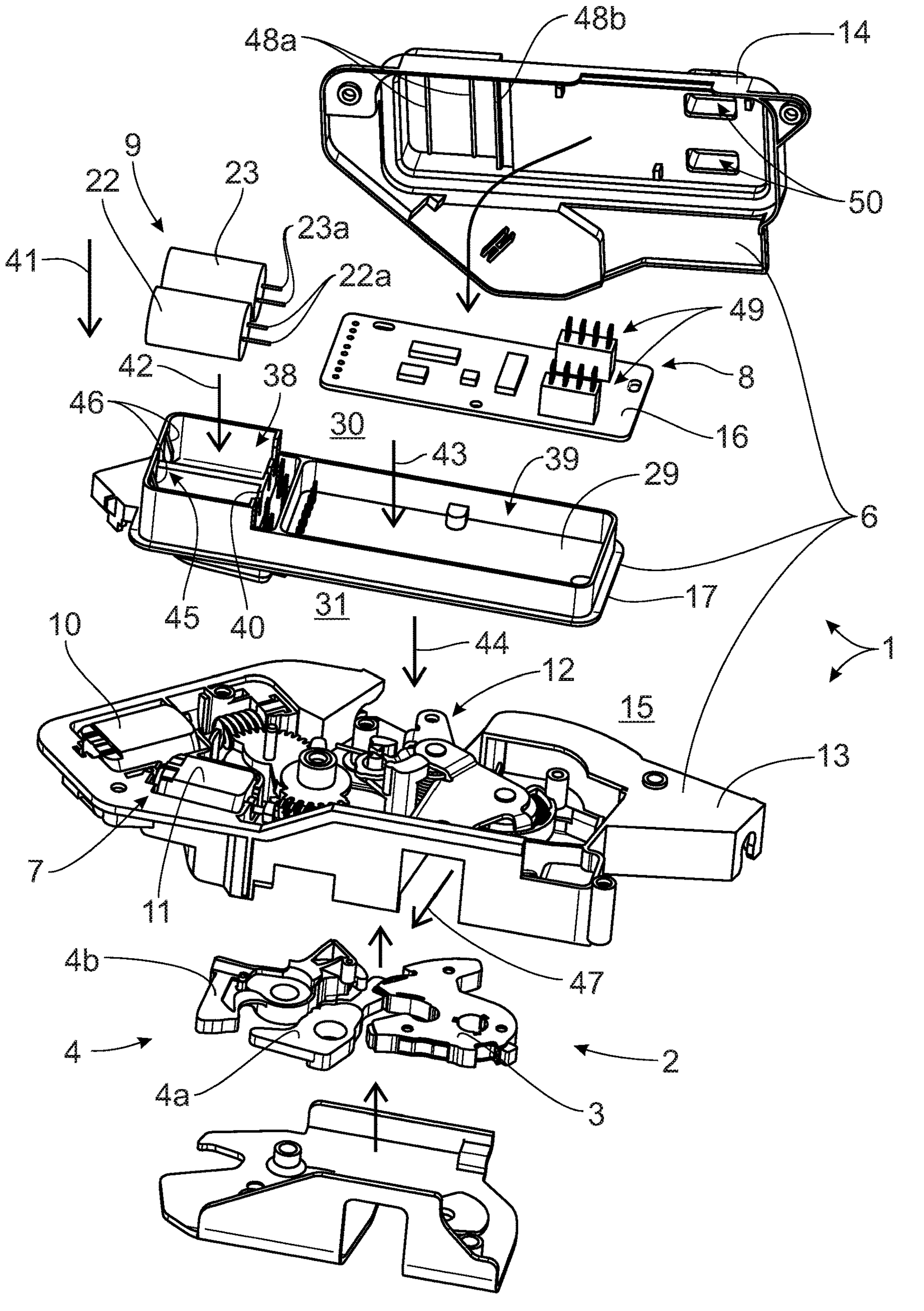
FIG. 1 shows a motor vehicle lock according to the proposal in a partially exploded illustration.

FIG. 1 shows that the motor vehicle lock 1 is equipped with a locking mechanism 2 consisting of a lock striker plate 3 and a locking pawl arrangement 4 which is assigned to the lock striker plate. The lock striker plate 3 interacts in a customary way with a closing part 5, in order to hold the associated closure element in the closed position. For this purpose, the locking pawl arrangement 4 consisting of two locking pawls 4*a*, 4*b* locks the lock striker plate 3 in its respective closed position. In order to open the locking mechanism 2, the locking pawl arrangement 4 (here, the locking pawl 4*b*) is to be unlatched.

The closing part 5 may be arranged on the motor vehicle body, whereas the motor vehicle lock 1 is arranged on the closure element. This can also be provided the other way around.

Furthermore, the motor vehicle lock 1 has a lock housing structure 6 which is in multiple pieces, as is likewise shown in FIG. 1. A motorized drive arrangement 7 for the motorized drive of at least one mechanical lock component (here, the locking pawl 4*b*), a control unit 8 for the actuation of the drive arrangement 7, and a (here as an example, capacitive) energy storage arrangement 9 for the electric voltage supply of the drive arrangement 7 and/or the control unit 8 are provided in or on the lock housing structure 6. The drive arrangement 7 has a first electric drive motor 10 which serves to unlatch the locking pawl 4*b* and therefore to open the locking mechanism 2. The drive arrangement 7 can fundamentally have only a single electric drive motor. It may be that the drive arrangement 7 has a second drive motor 11 which serves to set mechanical closed states. For this purpose, a lock mechanism 12 is provided which can be moved into the different closed states by way of the second drive motor 11.

The motor vehicle lock 1 which is shown is an electric lock with mechanical redundancy. This means that the locking mechanism 2 can be opened firstly by way of the drive arrangement 7 and secondly by way of a manual actuation, for example via an exterior door handle which can be deflected manually. The motor vehicle lock 1 can fundamentally also be a pure electric lock, however.

It is essential then that the lock housing structure 6 has an inner housing part 13 which is fitted with the locking mechanism 2 and the drive arrangement 7, a housing cover 14 for closing an upper side 15 of the inner housing part 13, and, between the inner housing part 13 and the housing cover 4, a control housing part 17 which is fitted with a planar control board 16 of the control unit 8 and the energy storage arrangement 9. This arrangement allows the complete fitting of the control housing part 17 with the energy storage arrangement 9, the control board 16 and possibly further electric or electronic components such as actuators, sensors, switches or the like. The control housing part 17 which is fitted in this way forms a self-contained functional unit which can already be subjected to a functional test in the said preassembled state.

It may be noted that the term “closing” is to be interpreted broadly in conjunction with the housing parts, in particular with the housing cover 14. This is not necessarily closing which is sealed against liquid on all sides, but rather can also be realised in the sense of a covering. This is, in particular, in light of the fact that leadthroughs for levers or the like may possibly have to be provided depending on the design of the motor vehicle lock 1.

Figure 2:
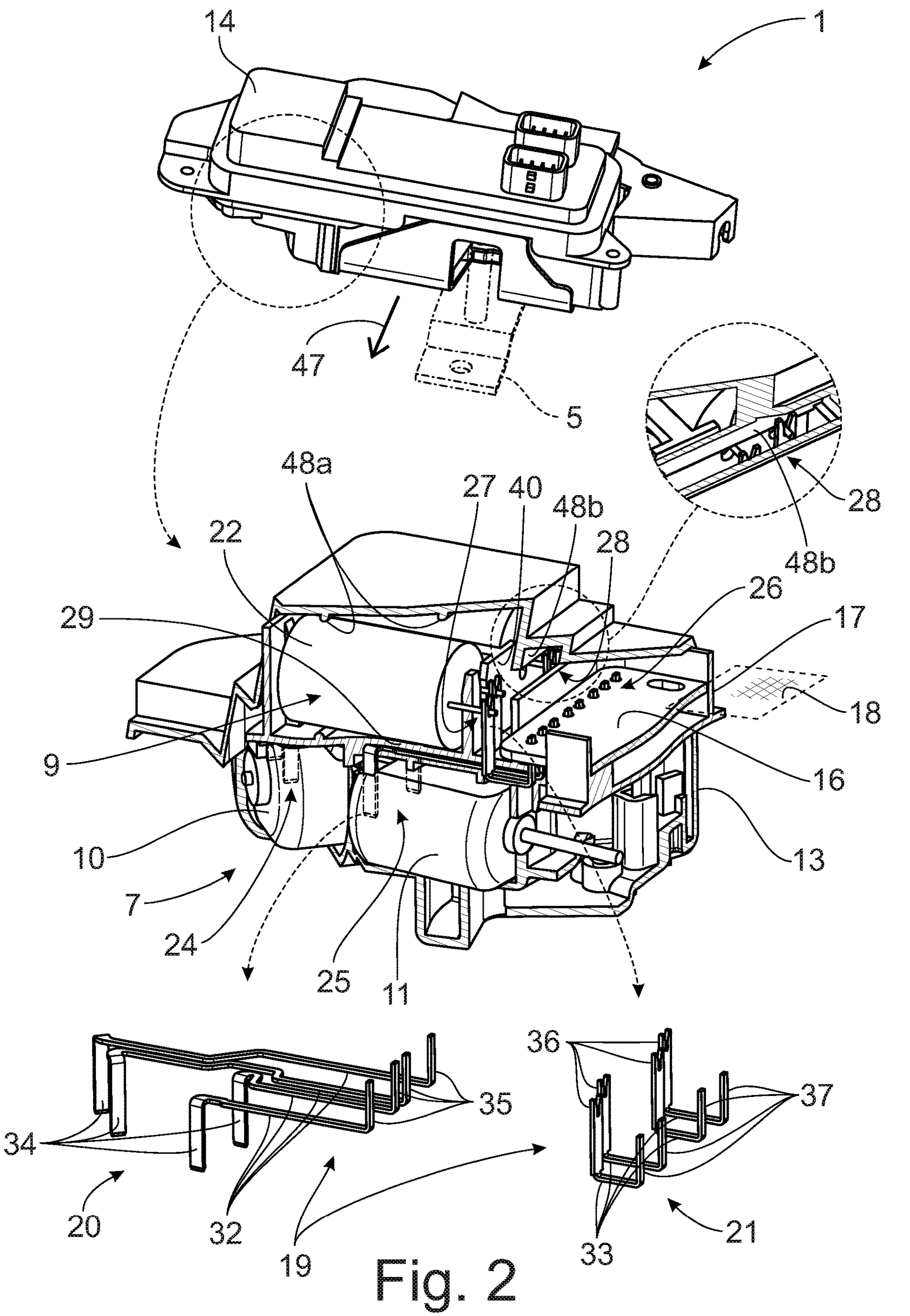
FIG. 2 shows the motor vehicle lock according to FIG. 1 in a partially sectioned illustration.

It is essential, furthermore, that the control housing part 17 is assigned an electrically conducting leadframe 19 which consists of leadframe lines 20, 21 and extends at least in sections along the board plane 18 of the control board 16, at least part of the drive arrangement 7 being connected electrically via the leadframe lines 20, 21 of the leadframe 19 to the control board 16. The leadframe lines 20 which are assigned to the drive arrangement 7 are shown in FIG. 2. It can be seen from the said illustration that the drive arrangement 7, in particular the drive motors 10, 11, can be arranged largely in any desired manner along the board plane 18 of the control board 16, without it being necessary for the control board 16 to have correspondingly large dimensions. Furthermore, FIG. 2 shows that the establishing of a plug-in connection which is still to be described with the leadframe 19 is readily possible on account of the extent of the leadframe 19 along the board plane 18, if the assembly movements which are required for this purpose are provided transversely with respect to the board plane 18 as in the exemplary embodiment which is shown.

Finally, FIG. 2 shows that additional electric or electronic components which are actuated and/or read out via the control board 16 can be readily connected to the leadframe 19.

Furthermore, it is conceivable that further control boards 16 are provided which are in turn connected to the leadframe 19.

The structural flexibility which can be achieved by way of the solution according to the proposal relates not only to the positioning of the drive arrangement 7, but rather also to the positioning of the energy storage arrangement 9. The energy storage arrangement 9 is here and may be likewise connected electrically via leadframe lines 21 of the leadframe 19 to the control board 16. It is possible as a result, as an example, that the energy storage arrangement 9 is positioned along the board plane 18 offset laterally with respect to the control board 16. In addition, it is the case here and may be that the energy storage arrangement 9 is positioned directly on or in the board plane 18 of the control board 16.

Numerous advantageous variants are conceivable for the design of the energy storage arrangement 9. In the case of the exemplary embodiment which is shown and to this extent, the energy storage arrangement 9 is a capacitive energy storage arrangement. An energy storage arrangement 9 of this type has capacitors for storing electric energy. The said capacitors may be supercapacitors which are also called ultracapacitors. As an alternative, the energy storage arrangement 9 can have other types of energy stores, in particular accumulators or the like.

In the case of the exemplary embodiment which is shown and to this extent, the energy storage arrangement 9 has a first capacitor 22 and a second capacitor 23 which are configured separately from one another. It can also be provided fundamentally that only a single capacitor or else more than two capacitors are assigned to the energy storage arrangement 9.

The fact that the electric connection between the energy storage arrangement 9 and the control board 16 can be of particularly insensitive configuration with respect to mechanical tolerances is interesting in the case of the abovementioned, lateral offset of the energy storage arrangement 9 relative to the control board 16 and the connection via the leadframe 19. Relative movements between the control board 16 and the energy storage arrangement 9 have an effect only via the leadframe 19 on the respective other component, in so far as the electric connection is affected. In addition, the leadframe 19 can be of flexible configuration at least in sections, which further increases the insensitivity to tolerances.

In addition, the control board 16 and the energy storage arrangement 9 are mounted separately from one another on the control housing part 17 in the case of the exemplary embodiment which is shown and as an example, with the result that a mechanical interaction between the said two components is reduced further. For example, mechanical vibrations of the energy storage arrangement 9 are transmitted at most to the control housing part 17, and not directly to the control board 16. This mechanical decoupling leads to mechanical protection of the control board 16 and therefore to a reduction of the failure probability of the control board 16.

Particular importance is given in the present case to the connection of the leadframe 19 to the involved components, which connection can be established simply and is insensitive to tolerances. The said connection may be a plug-in connection which can be configured as a plug/socket connection, as an insulation displacement connection or the like. A plug-in connection of this type can be established by way of a simple assembly movement and, in the case of a suitable design, permits a high insensitivity to tolerances along the respective assembly movement.

In detail, the case that the electric connection between the drive arrangement 7 and the leadframe 19 is configured as a plug-in connection, as can be gathered from the illustration according to FIG. 2. The plug-in connection between the drive arrangement 7 and the leadframe 19 may be a plug/socket connection 24, 25.

As an alternative or in addition, it can be provided that the electric connection between the control board 16 and the leadframe 19 is configured as a plug-in connection. According to a combination of FIG. 1 and FIG. 2, it is also provided here that the plug-in connection is configured as a plug/socket connection 26, with the result that the control board 16 can be plugged simply onto the leadframe 19.

Furthermore, it can be provided as an alternative or in addition that the electric connection between the energy storage arrangement 9 and the leadframe 19 is configured as a plug-in connection. FIG. 2 shows that the plug-in connection here is an insulation displacement connection 27, 28 which is provided between the connectors 22*a*, 23*a* and the leadframe 19. Here, the connectors 22*a*, 23*a* are of different dimensions in pairs in coordination with the associated connector tongues, in such a way that reversing the polarity of the connectors 22*a*, 23*a* is ruled out.

A common feature of all the plug-in connections addressed above is the easy establishing capability by way of a simple assembly movement, and the high insensitivity to mechanical tolerances.

The control housing part 17 is equipped with a dividing wall 29 which, here and as an example, runs parallel to the board plane 18 and defines an upper side 30 and a lower side 31 of the control housing part 17, the control board 16 and the energy storage arrangement 9 being arranged on the upper side, and the drive arrangement 7 being arranged on the lower side. This exemplary arrangement results in a compact design of the motor vehicle lock 1 overall. In this context, it is advantageous, in particular, that at least part of the leadframe 19 is embedded in the dividing wall 29.

In one or more embodiments, at least part of the leadframe 19 is embedded in a housing wall of the lock housing structure 6. The said housing wall is here and preferably the above-addressed dividing wall 29.

Variants for the design of the leadframe lines 20, 21 of the leadframe 19 are shown in FIG. 2. At least part of the leadframe lines 20, 21 of the leadframe 19 in each case may have a connecting piece 32, 33 which runs along the board plane 18, is embedded here and in the dividing wall 29, and has end-side connector tongues 34, 35; 36, 37, the connector tongues 34, 35; 36, 37 projecting from the dividing wall 29 transversely. In one exemplary refinement, the length of the connecting piece 32, 33 is greater than the respective lengths of the end-side connector tongues 34, 35; 36, 37. This takes into account the circumstance that the offset according to the proposal of the drive arrangement 7 and/or the energy storage arrangement 9 relative to the control board 16 goes beyond merely small displacement.

At least part of the connector tongues (here, the connector tongues 34, 35, 37) may be connector pins which in each case provide connector plugs of a plug/socket connection. As an alternative or in addition, it can be provided that at least part of the connector tongues (here, the connector tongues 36) are configured in the manner of insulation displacement connections. Furthermore, it can be provided as an alternative or in addition that at least part of the connector tongues are configured as resilient connector elements, and/or that at least part of the connector tongues are configured as connector sockets which are here and preferably resilient. All of these refinements of connector sockets serve to establish the above, electric connection to the leadframe 19 via a plug-in connection which can be established easily and is insensitive to mechanical tolerances. The relevant electric connections may be produced at least in part by way of a conventional soldering method, however.

The two end-side connector tongues 36, 37 of at least part of the leadframe lines 20, 21 (here as an example, the leadframe lines 21 which are assigned to the energy storage arrangement 9) project in the same direction from the dividing wall 29. This is appropriate, since both the energy storage arrangement 9 and the control board 16 are arranged on the upper side 30 of the control housing part 17.

This is different in the case of the leadframe lines 20 which are assigned to the drive arrangement 7. It may be the case here that the two end-side connector tongues 34, 35 project in opposite directions from the dividing wall 29. This takes into account the circumstance that the drive arrangement 7 is arranged on the lower side 31 of the control housing part 17, whereas the control board 16 is arranged on the upper side 30 of the control housing part 17.

A combination of FIG. 1 and FIG. 2 shows, furthermore, that, together with the inner housing part 13, the housing cover 14 covers the control housing part 17 completely, in particular in a sealing manner. This results in a further structural flexibility, in particular with regard to the configuration of the control housing part 17 and the seal requirements which are possibly to be realised there. Here, the term "sealing" is to be understood in the context of a liquid-tight seal.

It results from the illustration according to FIG. 1 that the control housing part 17 has a first housing section 38 for receiving the energy storage arrangement 9 and, separately therefrom, a second housing section 39 for receiving the control board 16. As shown in FIG. 1, the two housing sections 38, 39 may be separated from one another by way of a side wall 40. Furthermore, it is preferably the case here that the energy storage arrangement 9 has above-addressed, electric connectors 22*a*, 23*a* which protrude through the side wall 40 and, from the energy storage arrangement 9, are in electric connection on the other side of the side wall 40 with associated connector tongues 36 of the leadframe 19. As an example, the side wall 40 lies transversely with respect to the above-addressed dividing wall 29.

Together with the housing cover 14, the control housing part 17 forms at least one chamber which is closed in the above sense for receiving the energy storage arrangement 9 and/or the control board 16. In the case of the exemplary embodiment, it is provided that, together with the housing cover 14, the first housing section 38 and the second housing section 39 in each case configure a chamber which is closed in the above sense.

The motor vehicle lock 1 may be assigned an assembly direction 41, it being possible for the control housing part 17 to be fitted with the energy storage arrangement 9 in an assembly movement 42 in the assembly direction, in a manner which establishes the plug-in connection to the leadframe 19. As an alternative or in addition, it is provided that the control housing part 17 can be fitted with the control board 16 in an assembly movement 43 in the assembly direction 41, in a manner which establishes the plug-in connection to the leadframe 19.

Furthermore, it is provided as an alternative or in addition that the inner housing part 13 can be fitted with the control housing part 17 in an assembly movement 14 in the assembly direction 41, in a manner which establishes the plug-in connection to the leadframe 19. In addition to the electric connection according to the proposal, the exemplary embodiment which is shown discloses an interesting mechanical fixing of the energy storage arrangement 9. It is provided here that the control housing part 17 has a clamping arrangement 45, the energy storage arrangement 9 coming into clamping engagement with the control housing part 17 via the clamping arrangement 45 during the assembly movement 42 of the energy storage arrangement 9 in the assembly direction 41. For this purpose, the clamping arrangement 45 may include clamping ribs 46 which extend along the assembly direction 41. Other variants for the configuration of the clamping arrangement 45 are conceivable. The fact that not only an electric connection but rather also a mechanical connection is established by way of the assembly movement 42 of the energy storage arrangement 9 is particularly advantageous in the case of the clamping arrangement 45. In the present case, the assembly movement, in particular, of the energy storage arrangement 9 is given particular significance, since it has to be ensured that the energy storage arrangement 9, as a safety-relevant component, always maintains a reliable electric connection to the leadframe 19. This relates, in particular, to the situation of slamming of an associated closure element, in particular an associated motor vehicle door, which is associated with a corresponding action of force on the energy storage arrangement 9. For this purpose, the motor vehicle lock 1 is first of all assigned a closing direction 47, in which the motor vehicle lock 1 runs in the assembled state in the case of closing of the associated closure element. It is then preferably the case that the assembly movement 42 of the energy storage arrangement 9 is oriented differently, in particular transversely, with respect to the closing direction 47. This ensures that the electric connection of the energy storage arrangement 9 to the leadframe 19 is not impaired in the case of proper use.

A further measure for high operational safety consists in that the housing cover 14 has a hold-down arrangement 48*a* which acts in the assembly direction 41 in a non-positive manner on the energy storage arrangement 9, in particular on the housings of the capacitors 22, 23. This ensures that accelerations which possibly occur, in particular vibrations, cannot lead to an impairment of the electric connection of the energy storage arrangement 9 to the leadframe. Here and as an example, the hold-down arrangement 48*a* has web-like shaped-out formations which are arranged on an inner side of the housing cover 14.

As an alternative or in addition, the housing cover 14 has a contact holder arrangement 48*b* which acts in the assembly direction 41 in a non-positive manner on the connectors 22*a*, 23*a* of the energy storage arrangement 9, in particular of the capacitors 22, 23. This once again ensures that the connectors 22*a*, 23*a* cannot leave the connection to the leadframe 19.

In one or more embodiments, the control board 16 may be fitted with an electric plug arrangement 49 which is accessible through the housing cover 14. For this purpose, the housing cover 14 is equipped with corresponding recesses 50.

According to the method according to the proposal, the control housing part 17 is first of all fitted with the control board 16 and the energy storage arrangement 9. The inner housing part 13 is only subsequently fitted with the control housing part 17, as a result of which the electric connection between the control board 16 and the drive arrangement 7 is established. As described further above, a functional test can be performed by way of the first-mentioned method step, without it being necessary for the complete motor vehicle lock 1 to be assembled.

As an example, the case that the control housing part 17 is fitted with the control board 16 and/or the energy storage arrangement 9, by the control board 16 and/or the energy storage arrangement 9 being joined to the leadframe 19. It was addressed further above that this is preferably provided via a plug-in connection. Reference may be made to all the comments with respect to the motor vehicle lock 1 according to the proposal which are suitable for explaining the method according to the proposal.

The following is a list of reference numbers shown in the Figures. However, it should be understood that the use of these terms is for illustrative purposes only with respect to one embodiment. And, use of reference numbers correlating a certain term that is both illustrated in the Figures and present in the claims is not intended to limit the claims to only cover the illustrated embodiment.

PARTS LIST

1 motor vehicle lock
2 locking mechanism
3 lock striker plate
4 locking pawl arrangement
5 closing part
6 lock housing structure
7 drive arrangement
8 control unit
9 energy storage arrangement
10 first electric drive motor
11 second drive motor
12 lock mechanism
13 inner housing part
14 housing cover
15 upper side
16 control board
17 control housing part
18 board plane
19 leadframe
20 leadframe lines
21 leadframe lines
22 first capacitor
23 second capacitor
24 plug/socket connection
25 plug/socket connection
26 plug/socket connection
27 insulation displacement connection
28 insulation displacement connection
29 dividing wall
30 upper side
31 side
32 piece
33 piece
34 connector tongues
35 connector tongues
36 connector tongues
37 connector tongues
38 first housing section
39 second housing section
40 side wall
41 assembly direction
42 assembly movement
43 assembly movement
45 arrangement
46 ribs
47 closing direction
49 electric plug arrangement
4*a* two locking pawls
4*b* locking pawl
4*b* two locking pawls
50 corresponding recesses
22*a* connectors
23*a* connectors
48*a* hold-down arrangement
48*b* contact holder arrangement While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A motor vehicle lock comprising:

a locking mechanism provided with a mechanical lock component;

a drive arrangement configured to drive the mechanical lock component;

a lock housing including an inner housing part configured to receive the locking mechanism and the drive arrangement, a housing cover closing an upper side of the inner housing part, and a control housing part;

a control unit configured to actuate the drive arrangement and including a planar control board that defines a board plane;

an energy storage arrangement disposed in or on the lock housing and configured to provide electric voltage supply to the drive arrangement and/or the control unit, wherein the control housing part that receives the planar control board and the energy storage arrangement disposed between the inner housing part and the housing cover;

wherein the control housing part includes a dividing wall that defines an upper side and a lower side of the control housing part, and the control board and the energy storage arrangement are arranged on the upper side and the drive arrangement is arranged on the lower side; and a lead frame including leadframe lines to electrically connect the energy storage arrangement to the control board, and wherein the leadframe lines connecting at least part of the drive arrangement to the control board includes a connecting piece embedded in the dividing wall and extending along the board plane, and defines end-side connector tongues, which project transversely from the dividing wall in opposite directions to be received in the drive arrangement and the control board respectively.

2. The motor vehicle lock of claim 1, wherein the energy storage arrangement is electrically connected to the control board via the leadframe lines.

3. The motor vehicle lock of claim 1, wherein the energy storage arrangement is positioned along the board plane and is laterally offset with respect to the control board.

4. The motor vehicle lock of claim 1, wherein an electric connection between the drive arrangement and the leadframe, an electric connection between the control board and the leadframe, and/or an electric connection between the energy storage arrangement and the leadframe are/is formed by a plug-in connection.

5. The motor vehicle lock of claim 1, wherein at least part of the end-side connector tongue is a connector pin, a resilient connector element, a resilient connector socket, and/or an insulation displacement connector.

6. The motor vehicle lock of claim 1, wherein the leadframe lines include a first leadframe line provided with a first end-side connector tongue and a second leadframe line provided with a second end-side connector tongue each electrically connected to the energy storage arrangement and each projecting in a first direction from the dividing wall.

7. The motor vehicle lock of claim 6, wherein first leadframe line is provided with a third end-side connector tongue and the second leadframe line is provided with a fourth end-side connector tongue, wherein the third end-side connector tongue and the fourth end-side connector tongue are each electrically connected to the drive arrangement and project in opposing directions from the dividing wall.

8. The motor vehicle lock of claim 1, wherein the inner housing part in conjunction with the housing cover completely enclose the control housing part and form a sealed connection.

9. The motor vehicle lock of claim 1, wherein the control housing part includes a first housing section that receives the energy storage arrangement, and a second housing section, separate from the first housing section, that receives the control board, wherein the first and second housing sections are separated from one another by a side wall, and the energy storage arrangement includes electric connectors protruding through the side wall and electrically connected to leadframe connector tongues.

10. The motor vehicle lock of claim 1, wherein the housing cover m conjunction with the control housing part forms at least one closed chamber that receives the energy storage arrangement and/or the control board.

11. The motor vehicle lock of claim 1, further comprising an electric plug arrangement disposed on the control housing part and for the control board wherein the electric plug arrangement is accessible through at least one recess defined by the housing cover.

12. A method of producing a motor vehicle lock according to claim 1, the method comprising:

attaching the control board and the energy storage arrangement to the control housing part; and subsequently attaching the inner housing part to the control housing part.

13. The method of claim 12, wherein the attaching step includes joining the control board and/or the energy storage arrangement to the leadframe.

14. The method of claim 12, wherein the attaching step includes moving the energy storage arrangement in an assembly direction to form a plug-in connection between the energy storage arrangement and the leadframe, and/or moving the control board in the assembly direction to form a plug-in connection between the control board and the leadframe.

15. The method of claim 14, wherein in an assembled state, the mechanical lock component is configured to move in a closing direction that is transverse to the assembly direction.

16. The method of claim 12, wherein the control housing part includes a clamping arrangement and wherein the attaching step includes the clamping arrangement clamping the energy storage arrangement.

17. A motor vehicle lock comprising:

a locking mechanism provided with a pawl and a catch forming a mechanical lock;

a drive arrangement provided with a motor configured to actuate the mechanical lock;

a control board configured to communicate signals to the drive arrangement actuate the motor and defining a board plane;

an energy storage arrangement configured to power the drive arrangement and/or the control board;

an inner housing part including a first side and a second side, opposing the first side, wherein the first side receives the drive arrangement and the locking mechanism is attached to the first side;

a control housing fixed to the second side of the inner housing part, wherein the control housing includes a dividing wall and receives the control board and the energy storage arrangement; and a number of leadframe lines extending parallel to the control board to electrically connect the drive arrangement and to electrically connect the energy storage arrangement to the control board, wherein the number of leadframe lines connecting at least part of the drive arrangement to the control board includes a connecting piece embedded in the dividing wall and extending along the board plane, and defines end-side connector tongues, which project transversely from the dividing wall in opposite directions to be received in the drive arrangement and the control board respectively.

* * * * *